(12) United States Patent
Mazanek et al.

(10) Patent No.: US 7,049,367 B2
(45) Date of Patent: May 23, 2006

(54) SELF-CROSSLINKING PU DISPERSIONS

(75) Inventors: Jan Mazanek, Köln (DE); Dieter Mager, Leverkusen (DE); Joachim Petzoldt, Monheim (DE); Heino Müller, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 201 days.

(21) Appl. No.: 10/411,902

(22) Filed: Apr. 11, 2003

(65) Prior Publication Data

US 2003/0199632 A1 Oct. 23, 2003

(30) Foreign Application Priority Data

Apr. 17, 2002 (DE) .............................. 102 16 945

(51) Int. Cl.
*C08J 3/00* (2006.01)
*C08K 3/20* (2006.01)
*C08L 75/00* (2006.01)
*C08G 18/00* (2006.01)
*C06G 18/81* (2006.01)

(52) U.S. Cl. ...................... 524/591; 524/589; 524/590; 524/839; 524/840; 528/44; 528/45; 528/85

(58) Field of Classification Search ................ 524/589, 524/590, 591, 839, 840; 528/44, 85, 45
See application file for complete search history.

(56) References Cited

U.S. PATENT DOCUMENTS

| 4,098,933 | A | 7/1978 | Burkhardt et al. ............. 24/379 |
| 4,119,602 | A | 10/1978 | Isgur et al. ............. 28/29.6 NR |
| 4,284,544 | A | 8/1981 | Wegner et al. ........ 424/29.2 TN |
| 4,433,017 | A | 2/1984 | Goto et al. ..................... 32/45 |
| 5,098,983 | A | 3/1992 | Mosbach et al. ............... 40/59 |
| 5,294,665 | A | 3/1994 | Pedain et al. ................ 576/591 |
| 5,434,005 | A | 7/1995 | Sugiura et al. ........... 424/423.1 |

FOREIGN PATENT DOCUMENTS

| CA | 2 364 603 | | 9/2001 |
| CA | 2 389 389 | | 4/2002 |
| DE | 27 08 611 | | 5/1978 |
| DE | 199 30 555 | | 1/2001 |
| DE | 100 32 977 | | 1/2002 |
| WO | WO0102457 | * | 1/2001 |
| WO | 02/24780 | | 3/2002 |

* cited by examiner

*Primary Examiner*—Patrick D. Niland
(74) *Attorney, Agent, or Firm*—Joseph C. Gil; Thomas W. Roy

(57) ABSTRACT

The present invention relates to aqueous self-crosslinking PU dispersions and to coatings prepared from them.

19 Claims, No Drawings

SELF-CROSSLINKING PU DISPERSIONS

BACKGROUND OF THE INVENTION

The present invention relates to aqueous self-crosslinking PU dispersions, to stoving enamels prepared from them, and to the use thereof in varnishes and paints, especially in automotive OEM coatings.

Recent years have seen an increase in the importance of aqueous paints and coating compositions, due to ever more stringent emissions guidelines in terms of the solvents released on application of the coating materials. Although aqueous coating systems are now available for many areas of application, they are often unable to match the high quality level of conventional, solvent-borne paints in terms of solvent resistance and chemical resistance or else in terms of elasticity and mechanical durability. In particular, to date, there have been no disclosures of polyurethane-based coating compositions which can be processed from the aqueous phase and which adequately meet the exacting requirements of the industry for automotive OEM finishing.

This is true not only of DE-A 4,001,783, which describes anionically modified aliphatic polyisocyanates, but also of the systems of DE-A 2,456,469, DE-A 2,814,815, EP-A 0 012,348 and EP-A 0 424,697, which describe aqueous stoving enamel binders based on blocked polyisocyanates and organic polyhydroxyl compounds. Additionally, the systems based on carboxyl-containing polyurethane prepolymers with blocked isocyanate groups, in accordance with DE-A 2,708,611, or the blocked water-soluble urethane prepolymers of DE-A 3,234,590, which are of high functionality and therefore largely unsuited to the production of elastic coatings, are also substantially unusable for this specified purpose.

Further improvements have been attained in recent years in the one-component (1K) stoving enamels used, such as, for example, in EP-A 0 576,952, which describes combinations of water-soluble or water-dispersible polyhydroxy compounds with water-soluble or dispersible blocked polyisocyanates, or in DE-A 19,930,555, which discloses combinations of a water-dispersible, hydroxy-functional binder component containing urethane groups, a binder component containing blocked isocyanate groups (which is prepared in a multi-stage reaction by way of two prepolymerization steps), an amino resin and further components. A disadvantage of these one-component systems is that the prepared components are then formulated to give coating materials, and so necessitate an additional mixing step.

The coating materials described in the prior art do not, however, meet all of the requirements on the part of the industry, including those relating to the solids content of varnishes and paints produced from them as well as their stability, as well as surface smoothness and gloss of coatings made of (?) them.

An object of the present invention was to provide improved 1K baking systems, where the coating materials should in particular have a high solids content and that the coatings should have a high gloss.

DESCRIPTION OF THE INVENTION

The present invention provides a process for preparing self-crosslinking polyurethane polymers comprising:
i) reacting an isocyanate component (A) having an isocyanate group functionality of 2 or more with (B1) an at least difunctional polyol component of number average molecular weight from 62 to 2500, which contains at least one acid-functional compound (C), to give an isocyanato-containing or hydroxyl-containing prepolymer,
ii) adding one or more hydroxy-functional components (B2) having an OH functionality of 1 or more to said prepolymer, and, if desired, adding an isocyanate component (A'), which may be identical to or different from (A), with the proviso that the product of step ii) is an NCO-functional product,
iii) mixing the resultant NCO-functional product with a blocking agent (D), and
iv) adding a polyol component (B3) having an OH functionality of 2 or more and a number average molecular weight of from 300 to 5000.

In one preferred embodiment of the invention the addition of the polyol component (B3) is followed in a final step by the addition of an acid-functional compound (C'), which may be identical to or different from (C), and of an isocyanate component (A"), which may be identical to or different from (A) and (A').

In the process of the invention the chosen ratio of the isocyanate groups, including the blocked groups, to all isocyanate-reactive groups is from 0.5 to 3.0:1, preferably 0.6 to 2.0:1, with particular preference from 0.8 to 1.5:1.

The present invention likewise provides self-crosslinking polyurethane polymers obtainable in accordance with the process of the invention.

Suitable isocyanate components (A), (A'), (A") are aliphatic, cycloaliphatic, araliphatic and/or aromatic isocyanates having an average isocyanate functionality of from 2 to 5, preferably 2, and having an isocyanate content of from 0.5 to 60% by weight, preferably from 3 to 40% by weight, with particular preference from 5 to 30% by weight. Specific examples include tetramethylene diisocyanate, cyclohexane 1,3- and 1,4-diisocyanate, hexamethylene diisocyanate (HDI), 1-isocyanato-3,3,5-trimethyl-5-isocyanatomethylcyclohexane (isophorone diisocyanate, IPDI), methylenebis(4-isocyanatocyclohexane), tetramethylxylylene diisocyanate (TMXDI), triisocyanatononane, tolylene diisocyanate (TDI), diphenylmethane 2,4'-and/or 4,4'-diisocyanate (MDI), triphenylmethane 4,4'-diisocyanate or naphthylene 1,5-diisocyanate, and any desired mixtures of such isocyanates. Preference is given to isophorone diisocyanate, bis (4,4-isocyanatocyclohexylmethane) and hexamethylene diisocyanate.

Of preferred suitability as component (A), (A'), (A") are polyisocyanates which contain heteroatoms in the radical containing the isocyanate groups. Examples thereof are polyisocyanates containing carbodiimide groups, allophanate groups, isocyanurate groups, urethane groups and biuret groups. Particularly preferred polyisocyanates are those used primarily in the production of coating materials, examples being modification products of the abovementioned simple poly-isocyanates that contain biuret, isocyanurate or uretdione groups, especially those of hexamethylene diisocyanate or of isophorone diisocyanate.

Also suitable are low molecular weight polyisocyanates containing urethane groups, such as may be obtained by reacting IPDI or TDI, employed in excess, with simple polyhydric alcohols of the molecular weight range from 62 to 300, in particular with trimethylolpropane or glycerol.

Suitable polyisocyanates further include the known prepolymers containing terminal isocyanate groups, such as are obtainable in particular by reacting the abovementioned simple polyisocyanates, especially diisocyanates, with substoichiometric amounts of organic compounds having at least two isocyanate-reactive functional groups. In these known prepolymers the ratio of isocyanate groups to NCO-reactive hydrogen atoms is from 1.05:1 to 10:1, preferably from 1.5:1 to 4:1, the hydrogen atoms preferably originating from hydroxyl groups. The nature and proportions of the starting materials used in the preparation of NCO prepolymers are chosen such that the NCO prepolymers preferably have an average NCO functionality of from 2 to 3 and a number average molecular weight of from 500 to 10000, preferably from 800 to 4000.

Also suitable as polyisocyanates in the context of the invention are those polyurethane-, polyester-, and/or polyacrylate-based polymers containing free isocyanate groups, and also, where appropriate, mixtures of such polymers, in which only some of the free isocyanate groups are blocked with the blocking agents while the remaining portion is reacted with an excess of hydroxyl-containing polyesters, polyurethanes and/or polyacrylates and also, where appropriate, mixtures thereof to give a polymer which contains free hydroxyl groups and which on heating at appropriate baking temperatures crosslinks reactive groups without the addition of further isocyanate groups (self-crosslinking one-component baking systems).

The polyol component (B1) comprises 2-functional to 6-functional polyol components of molecular weight from 62 to 2500, preferably from 62 to 1000, with particular preference from 62 to 500, at least one of these components being an acid-functional compound (C). Examples of preferred polyol components are 1,4- and/or 1-3-butanediol, 1,6-hexanediol, 2,2,4-trimethyl-1,3-pentanediol, trimethylolpropane, polyesterpolyols and/or polyetherpolyols of the number average molecular weight of less than or equal to 1000.

The polyol component (B1) preferably contains more than 50% by volume of an acid-functional compound (C); with particular preference component (B1) contains exclusively compound (C), with very particular preference exclusively dimethylolpropionic acid.

Suitable acid-functional compounds (C)/(C') include hydroxy-functional carboxylic acids and/or -sulfonic acids, preferably mono- and dihydroxy-carboxylic acids, such as 2-hydroxyacetic acid, 3-hydroxypropanoic acid and 12-hydroxy-9-octadecanoic acid (ricinoleic) acid, for example. Particularly preferred carboxylic acids (C)/(C') are those in which the carboxyl group is hindered in its reactivity owing to steric effects, such as lactic acid, for example. Very particular preference is given to 3-hydroxy-2,2-dimethyl-propanoic acid (hydroxypivalic acid) and dimethylolpropionic acid.

The hydroxy-functional component (B2) is selected from the group of
b1) 2-functional to 6-functional alcohols having average molecular weights of from 62 to 300, preferably from 62 to 182, with particular preference from 62 to 118,
b2) linear difunctional polyols having an average molecular weight of from 300 to 4000, preferably from 300 to 2000, with particular preference from 300 to 1000,
b3) monofunctional linear polyethers having average molecular weights of from 300 to 3000, preferably from 300 to 2000, with particular preference from 300 to 1000.

Suitable polyol components (b1) include 2-functional to 6-functional alcohols and/or mixtures thereof which contain no ester groups. Typical examples are ethane-1,2-diol, propane-1,2-diol and -1,3-diol, butane-1,4-, -1,2- or -2,3-diol, hexane-1,6-diol, 1,4-dihydroxycyclohexane, glycerol, trimethylolethane, trimethylolpropane, pentaerythritol and sorbitol. As component b1) it is of course also possible to use alcohols containing ionic groups or groups which can be converted into ionic groups. Preference is given, for example, to 1,4- or 1,3-butanediol, 1,6-hexanediol and/or trimethylolpropane.

Suitable linear difunctional polyols (b2) are selected from the group of polyethers, polyesters and/or polycarbonates. The polyol component (b2) preferably comprises at least one diol which contains ester groups and is from the molecular weight range from 350 to 4000, preferably from 350 to 2000, with particular preference from 350 to 1000. The molecular weight in question here is the average molecular weight that can be calculated from the hydroxyl number. The ester diols generally comprise mixtures which may also include minor amounts of certain constituents whose molecular weight is below or above these limits. These are the polyester diols, known per se, which are synthesised from diols and dicarboxylic acids. Examples of suitable diols are 1,4-dimethylolcyclohexane, 1,4- or 1,3-butanediol, 1,6-hexanediol, neopentyl glycol, 2,2,4-trimethyl-1,3,-pentanediol, trimethylolpropane and also pentaerythritol, or mixtures of such diols. Examples of suitable dicarboxylic acids are aromatic dicarboxylic acids such as phthalic acid, isophthalic acid and terephthalic acid, cycloaliphatic dicarboxylic acids such as hexahydrophthalic acid, tetrahydrophthalic acid, endomethylenetetrahydrophthalic acid and their anhydrides and aliphatic dicarboxylic acids, which are used with preference, such as succinic acid, glutaric acid, adipic acid, suberic acid, azelaic acid and sebacic acid or their anhydrides.

Polyester diols based on adipic acid, phthalic acid, isophthalic acid and tetrahydrophthalic acid are used with preference as component (b2).

Used with particular preference as component (b2), however, are polycaprolactone diols of the average molecular weight range from 350 to 4000, preferably from 350 to 2000, with particular preference from 350 to 1000, which have been prepared in a manner known per se from a diol or diol mixture of the type exemplified above, as starter, and ε-caprolactone. The preferred starter molecule here is 1,6-hexanediol. Very particular preference is given to those polycaprolactone diols which have been prepared by polymerizing ε-caprolactone using 1,6-hexanediol as starter.

As linear polyol components (b2) it is also possible to use (co)polyethers of ethylene oxide, propylene oxide and/or tetrahydrofuran. Preferred polyethers are those having an average molecular weight of from 500 to 2000, such as polyethylene oxides or polytetrahydrofurandiols, for example.

Also suitable as (b2) are hydroxyl-containing polycarbonates, preferably of average molecular weight from 400 to 2000, such as hexanediol polycarbonate, for example.

Suitable monofunctional linear polyethers (b3) are, for example, (co)polyethers of ethylene oxide and/or propylene oxide. Preference is given to polyalkylene oxide polyethers, prepared starting from monoalcohols and having an average molecular weight of from 350 to 2500, containing at least 70% of ethylene oxide units. Particular preference is given to (co)polymers having more than 75% of ethylene oxide units and a molecular weight of from 300 to 2500, preferably from 500 to 1000. Starter molecules used in the preparation of these polyethers are preferably monofunctional alcohols having from 1 to 6 carbon atoms.

Suitable polyols (B3) are polyols having an OH functionality of more than 2 and having average molecular weights of from 300 to 5000, preferably from 300 to 3000, with particular preference from 300 to 2000.

Preferred polyols (B3) are, for example, polyethers of average molecular weight of from 300 to 2000 with an average functionality of from 2.5 to 4 OH groups per molecule. Likewise preferred are polyesters of average OH functionality from 2.5 to 4.0. Suitable diols and dicarboxylic acids for the polyesters are those specified under component (b2), but they additionally include short-chain polyols with a functionality of from three to six, such as trimethylolpropane, pentaerythritol or sorbitol, for example. It is preferred to use polyester polyols based on adipic acid, phthalic acid, isophthalic acid and tetrahydrophthalic acid.

Likewise suitable as component (B3) are (co)polyethers of ethylene oxide, propylene oxide and/or tetrahydrofuran with an average functionality of more than 2, and branched polycarbonates.

As blocking agents (D) it is possible to use all known monofunctional blocking agents, such as, for example, ε-caprolactam, diethylmalonate, ethyl acetoacetate, oximes such as butanone oxime, diisopropylamine, dimethylpyrazole, triazole or mixtures thereof. Preference is given for example, to ε-caprolactam, butanone oxime, diisopropylamine, 3,5-dimethylpyrazole, triazole and/or mixtures thereof.

For the process of the invention the reaction of component (A) with (B1) to give OH or NCO-functional prepolymers is of particular importance. This reaction should take place before all of the other components are added. Where necessary, further isocyanate (A') and/or (A") to be used should take place likewise after the preparation of the prepolymer. The preparation of the prepolymer can be carried out in the same reactor as the reaction with the other components to give the dispersions of the invention.

The process of the invention should be carried out in such a way that in the reaction of components (A) and (B1) there is as small as possible an amount of unreacted excess components (A) and/or (B1) present, in accordance with the theoretical stoichiometric equation.

The further reaction of the remaining components may take place in accordance with prior art methods which are known per se.

Preference, however, is given to a process characterized in that in one step component (A) is reacted with component (B1), which contains at least one acid-functional compound (C), to give an NCO-functional prepolymer, then components (b1), (b2) and (b3) and, where appropriate, the isocyanate component (A'), which may be identical to or different from (A), are added, the resultant NCO-functional product is partially blocked with a blocking agent (D), and, in a further stage, a polyol component (B3) is added. With particular preference in that case, in a final stage, an acid-functional compound (C'), which may be identical to or different from (C), and an isocyanate component (A"), which may be identical to or different from (A) and (A'), are added.

Thereafter the aqueous dispersions comprising the self-crosslinking polyurethanes of the invention are prepared by prior art techniques.

At least 50%, preferably from 80% to 120%, with particular preference from 95 to 105%, of the carboxylic acid groups present in the polyurethanes of the invention are neutralized with suitable neutralizing agents, followed by dispersion with deionized water. Neutralization may take place before, during or after the dispersing or dissolving step. Preference, however, is given to neutralization before the addition of water.

Examples of suitable neutralizing agents are triethylamine, dimethylaminoethanol, dimethylcyclohexylamine, triethanolamine, methyldiethanolamine, diisopropanolamine, diisopropylcyclohexylamine, N-methylmorpholine, 2-amino-2-methyl-1-propanol, ammonia or other customary neutralizing agents or neutralization mixtures thereof. Tertiary amines such as for example, triethylamine, diisopropylhexylamine, are preferred; dimethylethanolamine is particularly preferred.

Likewise provided by the present invention are aqueous dispersions comprising the self-crosslinking polyurethanes of the invention. These aqueous dispersions are used as aqueous one-component baking systems.

In the process of the invention from 5 to 60% by weight, preferably from 10 to 40% by weight, of the OH- and/or NCO-functional prepolymer, from 0 to 50% by weight, preferably from 5 to 40% by weight, with particular preference from 10 to 25% by weight, of component (A') and/or (A"), from 1 to 10% by weight, preferably from 1 to 5% by weight, of component (b1), from 5 to 40% by weight, preferably from 10 to 25% by weight, of component (b2), from 1 to 10% by weight, preferably from 1 to 5% by weight, of component (b3), from 10 to 60% by weight, preferably from 20 to 50% by weight, of component (B3), from 1 to 10% by weight, preferably from 1 to 5% by weight, of component (C') and from 1 to 20% by weight, preferably from 1 to 10% by weight, of component (D) are used, the sum of the components being 100%.

In order to regulate the viscosity of the reaction mixture, it is also possible if desired to add solvents to the reaction mixture. Suitable solvents are all known paint solvents such as, for example, N-methylpyrrolidone, methoxypropyl acetate or xylene. They are used preferably in amounts of from 0 to 10% by weight, more preferably from 0 to 5% by weight. The solvent is preferably added during the polymerisation.

It is also possible to add a fairly large amount of a (partly) water-miscible solvent such as acetone or methyl ethyl ketone to the reaction mixture. After the end of the reaction, water is added to the reaction mixture and the solvent is distilled off. This is also referred to as the acetone or slurry process. The advantage of this procedure lies in the low solvent fraction in the finished dispersion.

It is likewise possible to add catalysts to the reaction mixture. Dibutyltin dilaurate and dibutyltin octoate are preferred.

The dispersions comprising the polyurethanes of the invention are used as one-component baking system containing free hydroxyl groups for preparing varnishes, paints and other formulations. Any auxiliaries and additives of coating technology that are to be used as well, such as pigments, levelling agents, bubble prevention additives or catalysts, for example, may likewise be added to the aqueous dispersions comprising the polyurethanes of the invention.

The invention also provides for the use of dispersions comprising the polyurethanes of the invention for preparing paints, varnishes or adhesives.

The aqueous one-component coating compositions comprising the polyurethanes of the invention may be applied to any desired heat-resistant substrates in one or more layers by any arbitrary methods of coating technology, such as spraying, brushing, dipping, flow coating, or with the aid of rollers and doctor blades. The coating films generally have a dry film thickness of from 0.01 to 0.3 mm.

Suitable substrates are, for example, metal, plastic, wood or glass. The curing of the coating film takes place at from 80 to 220° C., preferably at from 130 to 180° C.

The aqueous one-component coating compositions comprising the polyurethanes of the invention are suitable with preference for producing coatings and paint systems on steel panels, such as are used, for example, for producing vehicle bodies, machines, panels, drums or freight containers. Particular preference is given to the use of the aqueous one-component coating compositions comprising the polyurethanes of the invention for the preparation of automotive primer surfaces and/or topcoat materials.

The invention is further illustrated but is not intended to be limited by the following examples in which all parts and percentages are by weight unless otherwise specified.

EXAMPLES

Example 1

Preparation of an NCO Prepolymer 309.85 g (2.31 mol) of dimethylolpropionic acid and 822.36 g of N-methylpyrrolidone were stirred in a stirring vessel at 50° C. until a clear solution was formed (60 minutes). Then 770.62 g (3.47 mol) of isophorone diisocyanate were added at 50° C. and the temperature was raised to 85° C. Stirring was continued at 85° C. for 3 hours, after which the NCO content of the reaction mixture was 5.06% (calculated 5.10%). The reaction mixture was then used directly for further syntheses.

Example 2

Preparation of an NCO Prepolymer

The procedure described in Example 1 was repeated but after the end of the reaction 1113.11 g (5.00 mol) of isophorone diisocyanate were added and the reaction mixture was cooled to room temperature with stirring. A clear yellow liquid was formed with a viscosity of 9000 mPas at 23° C. and a NCO content of 17.10% (calculated 17.16%).

Example 3

Preparation of an NCO Prepolymer

The procedure described in Examples 1 and 2 was repeated but using 1214.64 g (1.6 mol) of dimethylolpropionic acid, 427.2 g of N-methylpyrrolidone and 711.68 g (3.2 mol) of isophorone diisocyanate in accordance with Example 1 and 622.72 g (2.8 mol) of isophorone diisocyanate in accordance with Example 2. The yellow reaction mixture obtained had a viscosity of 11000 mPas at 23° C. and a NCO content of 12.35% (calculated 12.42%).

Example 4

Inventive 123.90 g (0.295 mol) of a polyester formed from adipic acid and 1,6-hexanediol with an average molar weight of 840, 11.25 g (0.005 mol) of a polyethylene oxide-propylene oxide polyether (80:20 mol/mol) prepared starting from N-butanol, and with an average molar weight of 2250, 6.76 g (0.15 mol), of 1,4-butanediol and 6.71 g (0.1 mol) of trimethylolpropane were heated to 85° C. in a stirred vessel and mixed homogeneously. Following the addition of 260.43 g (1.1 eq. NCO) of compound from Example 3, the mixture was stirred at 85° C. for 135 minutes. The product obtained contained 4.41% (calculated: 4.45%) of isocyanate groups. Subsequently, at 85° C., 26.54 g (0.305 mol) of butanone oxime were added over the course of 20 minutes, followed by stirring for 10 minutes. Then 160 g (0.5 eq OH) of a polyester formed from adipic acid, isophthalic acid, trimethylolpropane, neopentyl glycol and propylene glycol, with an OH number of 189, were added and the reaction mixture was stirred at 85° C. overnight. Thereafter it no longer contained any isocyanate groups (by IR spectroscopy). At 85° C. a solution of 5.91 g (0.05 mol) of hydroxypivalic acid in 9.45 g of N-methylpyrrolidone was added, the mixture was stirred for 5 minutes and then 11.12 g (0.1 mol) of isophorone-diisocyanate were added and the mixture was stirred at 85° C. for 200 minutes. The reaction mixture then no longer contained any isocyanate groups. Then 22.29 g (0.25 mol) of N-dimethylethanolamine were added, after which the mixture was stirred for 10 minutes and then dispersed with 1390 g of hot water at 50° C., with vigorous stirring, followed by stirring at 50° C. for 3 hours, after which it was left to cool with stirring. The dispersion obtained had the properties below:

| | |
|---|---|
| Solids content: | 30% |
| Viscosity (DIN cup 4): | 14 s |
| Particle size (laser correlation Spectroscopy, LCS) | 31 nm |

Example 5

Inventive

The procedure described in Example 4 was repeated but, instead of the prepolymer from Example 3, first 6.76 g (0.15 mol) of 1,4-butanediol, 26.83 g (0.4 mol) of dimethylolpropionic acid in 53.4 g of N-methylpyrrolidone and 122.32 g (1.1 mol) of isophorone diisocyanate were reacted to an NCO content of 10.97% (calculated 11.04%), after which 44.48 g (0.4 mol) of isophorone diisocyanate and also the polyester, polyether, 1,4-butanediol and trimethylolpropane in accordance with Example 4 were added. The dispersion obtained had the properties below:

| | |
|---|---|
| Solids content: | 30% |
| Viscosity (DIN cup 4): | 16 s |
| Particle size (LCS): | 30 nm |

Example 6

Inventive

The procedure described in Example 4 was repeated but, instead of Example 3, first 123.9 g (0.295 mol) of the polyester formed from adipic acid and 1,6-hexanediol, 26.83 g (0.4 mol) of dimethylolpropionic acid in 62.85 g of N-methylpyrrolidone and 115.93 g (1.0425 mol) of isophorone diisocyanate were reacted to an isocyanate content of 3.85%, after which 50.88 g (0.458 mol) of isophorone diisocyanate and also the polyether, 1,4-butanediol and trimethylolpropane in accordance with Example 4 were added. The dispersion obtained had the properties below:

| | |
|---|---|
| Solids content: | 30% |
| Viscosity (DIN cup 4): | 17 s |
| Particle size (LCS): | 26 nm |

Example 7

Inventive

The procedure described in Example 4 was repeated but using 9.01 g (0.2 mol) of 1,4-butanediol and 102.90 g (0.245 mol) of polyester formed from adipic acid and 1,6-hexanediol. The dispersion obtained had the properties below:

| | |
|---|---|
| Solids content: | 30% |
| Viscosity (DIN cup 4): | 14 s |
| Particle size (LCS): | 28 nm |

Example 8

Inventive

The procedure described in Example 7 was repeated but using, instead of the compound from Example 3, 256.38 g (1.1 eq. NCO) of the compound from Example 2 and, instead of the polyether, 2.5 g (0.005 mol) of a methanol ethoxylate. The dispersion obtained had the properties below:

| | |
|---|---|
| Solids content: | 30% |
| Viscosity (DIN cup 4): | 13 s |
| Particle size (LCS): | 48 nm |

Example 9

Inventive

The procedure described in Example 8 was repeated but using, instead of the compound from Example 2, a reaction product of 59.49 g (0.535 mol) of isophorone diisocyanate and 26.83 g (0.4 mol) of dimethylolpropionic acid (as a solution in 53.40 g of N-methylpyrrolidone) having an NCO content of 4.02% (calculated 4.06) in a mixture with 107.31 g (0.97 mol) of isophorone diisocyanate. Before the addition of butanone oxime the reaction mixture possessed 4.92% of NCO groups. The dispersion obtained had the properties below:

| | |
|---|---|
| Solids content: | 30% |
| Viscosity (DIN cup 4): | 13 s |
| Particle size (LCS): | 61 nm |

Example 10

Inventive

The procedure described in Example 9 was repeated but using a reaction product of isophorone diisocyanate and dimethylolpropionic acid having an isocyanate content of 4.00%. Before butanone oxime was added, the reaction mixture had an NCO content of 4.40%. The dispersion had the properties below:

| | |
|---|---|
| Solids content: | 30% |
| Viscosity (DIN cup 4): | 12 s |
| Particle size (LCS): | 82 nm |

Example 11

Inventive

The procedure described in Example 7 was repeated but using, instead of the compound from Example 3, a mixture of the reaction product of 20.12 g (0.3 mol) of dimethylolpropionic acid, dissolved in 53.40 g of N-methylpyrrolidone, and 50.04 g (0.45 mol) of isophorone diisocyanate having an isocyanate content of 5.08% (calculated 5.10%) with 105.64 g (0.95 mol) of isophorone diisocyanate. The amount of water was 668.82 g. The dispersion obtained had the properties below:

| | |
|---|---|
| Solids content: | 40% |
| Viscosity (DIN cup 4): | 12 s |
| Particle size (LCS): | 96 nm |

Example 12

Inventive

The procedure described in Example 8 was repeated but using 11.25 g (0.025 mol) of polyether from Example 4 and 767.75 g of water. The dispersion had the properties below:

| | |
|---|---|
| Solids content: | 40% |
| Viscosity (DIN cup 4): | 21 s |
| Particle size (LCS): | 63 nm |

Example 13

Inventive

The procedure described in Example 11 was repeated but using 11.25 g (0.025 mol) of polyether from Example 4 and 729.32 g of water. The dispersion had the properties below:

| | |
|---|---|
| Solids content: | 40% |
| Viscosity (DIN cup 4): | 18 s |
| Particle size (LCS): | 81 nm |

Example 14

Inventive 309.85 g (2.31 mol) of dimethylolpropionic acid were dissolved in 822.4 g of N-methylpyrrolidone with stirring at 80° C. and the solution was cooled to 50° C. Following the addition of 770.6 g (3.456 mol) of isophorone diisocyanate the temperature was raised to 85° C. and the mixture stirred for 4 hours. The NCO content reached 5.09% (calculated 5.10%). 1113.1 g (10.0 mol) of isophorone diisocyanate were added to this mixture and stirred in homogeneously (portion I).

To 195.84 g (0.8 eq. NCO) of portion I were added 33.36 g (0.3 mol) of isophorone diisocyanate, 102.90 g (0.245 mol) of polyester formed from adipic acid and 1,6-hexanediol, 2.50 g (0.005 mol) of monofunctional polyethylene oxide, 9.01 g (0.2 mol) of 1,4-butanediol and 6.71 g (0.1 mol) of trimethylolpropane and the mixture was stirred at 85° C. for 3½ hours. Thereafter, at 80° C., 30.86 g (0.305 mol) of diisopropylamine were added over the course of 30 minutes, followed by stirring for 10 minutes. Then 159.09 g (0.5 eq. OH) of a polyester formed from adipic acid, isophthalic acid, trimethylolpropane, neopentyl glycol and propylene glycol with an OH number of 189 were added and the reaction mixture was stirred at 80° C. overnight. Thereafter, NCO groups were no longer detectable by IR spectroscopy. Subsequently, at 80° C., 5.53 g of dimethylolpropionic acid in solution in 9.45 g of N-methylpyrrolidone and 10.00 g (0.09 mol) of isophorone diisocyanate were added and the mixture was stirred at 80° C. for 3 hours (after which there were no longer any free NCO groups present). Subsequently, 16.94 g (0.19 mol) of N-dimethylethanolamine were added and the mixture was stirred to 80° C. for 20 minutes. Then 1043 g of deionized water at a temperature of 80° C. were added and the mixture was subsequently stirred at 80° C. for one hour and cooled to room temperature over the course of 5 hours, with stirring. The dispersion had the properties below:

| | |
|---|---|
| Solids content: | 30% |
| Viscosity (DIN cup 4) | 15 s |
| pH: | 9.04 |
| Particle size (LCS): | 50 nm |

Example 15

Inventive 26.80 g (0.4 mol) of dimethylolpropionic acid in solution in 77.84 g of N-methylpyrrolidone were added at 80° C. to 104.8 g (0.8 mol) of bis(4,4'-isocyanatocyclohexyl)methane (Desmodur® W, Bayer A G, Lev. Del.) and stirred at 80° C. for 2 hours. The temperature was then raised to 90° C. and stirring was continued for 2 hours until an NCO content of 7.99% (calculated 8.02%) was reached. The mixture was then cooled to 80° C. and 94.0 g (0.72 mol) of Desmodur® W, 112.13 g (0.345 mol) of a linear polycaprolactone polyester, 11.25 g (0.0225 mol) of a monofunctional polyether with an average molar weight of 500, 6.70 g (0.1 mol) of trimethylolpropane and 4.50 g (0.1 mol) of 1,4-butanediol were added and stirring was continued for 5 hours until an isocyanate group content of 4.66% (calculated 4.79%) was reached. The mixture was then cooled to 70° C. and 40.48 g (0.4 mol) of diisopropylamine were added over the course of 60 minutes at this temperature. This was followed by 30 minutes of stirring; the NCO content was 0.75% (calculated 0.83%). Subsequently 230.0 g (0.575 eq. OH) of a branched polyester (Desmophen® 670, 4.25% by weight OH groups, Bayer A G, Lev., Del.) were added and the mixture was stirred at 70° C. for 2 hours more (until there were no free NCO groups present). Then 17.83 g (0.20 mol) of N-dimethyl-ethanolamine were added and the mixture was stirred for 10 minutes. Thereafter, with vigorous stirring, 932.14 g of hot deionized water at 70° C. were added and the mixture was subsequently stirred at 70° C. for 1 hour and then cooled to room temperature with stirring. The dispersion obtained had the properties below:

| | |
|---|---|
| Solids content: | 30% |
| Viscosity (23° C., rotational viscometer): | 100 mPas |
| Particle size (LCS): | 71 nm |

Example 16

Inventive

The procedure described in Example 14 was repeated but using, instead of the short-chain polyether, 11.25 g of a monofunctional polyether prepared starting from butanol and using ethylene oxide and propylene oxide (80:20, weight/weight) with an average molar weight of 2250 and using 15.58 g (0.175 mol) of N-dimethylethanolamine and 788.3 g of water. The dispersion had the properties below:

| | |
|---|---|
| Solids content: | 45% |
| Viscosity (23° C., rotational viscometer): | 7000 mPas |
| Particle size (LCS): | 74 nm |

Example 17

Inventive

The procedure described in Example 14 was repeated but adding 5.90 g (0.05 mol) of hydroxypivalic acid in solution in 9.45 g of N-methylpyrrolidone and 13.10 g (0.1 mol) of Desmodur® W (Bayer A G, Lev., Del.) and stirring for 90 minutes until NCO groups were no longer detectable in the IR spectrum of the reaction mixture before the addition of 15.58 g (0.175 mol) of N-dimethylethanolamine at 70° C. Thereafter 947.8 g of water were added. This dispersion obtained had the properties below:

| | |
|---|---|
| Solids content: | 40% |
| Viscosity (23° C., rotational viscometer): | 30 mPas |
| Particle size (LCS): | 110 nm |

Comparative Example 1

The procedure described in Example 4 was repeated but no NCO-functional prepolymer was prepared; instead, all the starting materials used in Example 4 up to the blocking step with butanone oxime were allowed to react statistically in a mixture. The dispersion obtained had the properties below:

| | |
|---|---|
| Solids content: | 30% |
| Viscosity (DIN cup 4): | 19 s |
| Particle size (LCS): | 25 nm |

Comparative Example 2

The procedure described in Example 17 was repeated but no NCO-functional prepolymer was prepared; instead, all the starting materials used in Example 17 up to the blocking step with butanone oxime were allowed to react statistically in a mixture. The dispersion obtained had the properties below:

| | |
|---|---|
| Solids content: | 30% |
| Viscosity (rotational viscometer): | 100 mPas |
| Particle size (LCS): | 50 nm |

The advantages of the new developments lie clearly in the solids content at the same pH of the paint and in the higher gloss levels.

Application Examples

The following examples illustrate the improvement in the properties of coatings through the use of the dispersions of the invention, especially in the maximum achievable solids content for a given efflux time and pH and in the gloss.

Comparative Example 3

30.93 g of a pigment grinding paste set out below are stirred together with 68.26 g of a 30% polyurethane dispersion from Comparative Example 1 and 0.33 g of 10% strength aqueous dimethylethanolamine solution and also 0.48 g of a 97%, commercial, water-dilutable melamine resin (Maprenal® MF 904, Solutia, Del.). A spray viscosity of 22 s is produced: ISO cup 5 mm.

Example 18

Inventive 37.29 g of the pigment grinding paste set out below are mixed thoroughly with 61.73 g of a 40% polyurethane dispersion from Example 12 and 0.40 g of 10% strength aqueous dimethylethanolamine solution and also 0.58 g of a 97%, commercial, water-dilutable melamine resin (Maprenal® MF 904, Solutia, Del.). A spray viscosity of about 21 s is produced: ISO cup 5 mm.

Example 19

Inventive 37.17 g of the pigment grinding paste set out below are stirred together with 61.53 g of a 40% polyurethane dispersion from Example 13 and 0.72 g of 10% strength aqueous dimethylethanolamine solution and also 0.58 g of a 97%, commercial, water-dilutable melamine resin (Maprenal® MF 904, Solutia, Del.). A spray viscosity of about 22 s is produced: ISO cup 5 mm.

Comparative Example 4

30.93 g of a pigment grinding paste set out below are stirred together with 68.26 g of a 30% polyurethane dispersion from Comparative Example 2 and 0.33 g of 10% strength aqueous dimethylethanolamine solution and also 0.48 g of a 97%, commercial, water-dilutable melamine resin (Maprenal® MF 904, Solutia, Del.). A spray viscosity of about 27 s is produced: ISO cup 5 mm.

Example 20

Inventive 35.39 g of the pigment grinding paste set out below are stirred together with 58.59 g of a 40% polyurethane dispersion from Example 17 and 0.38 g of 10% strength aqueous dimethylethanolamine solution and also 0.55 g of a 97%, commercial, water-dilutable melamine resin (Maprenal® MF 904, Solutia, Del.) and diluted with distilled water to a spray viscosity of about 28 s: ISO cup 5 mm.

Pigment Grinding Paste for Coatings Examples

A predispersed slurry consisting of 11.0 g of 70%, water-dilutable polyester resin (Bayhydrol® D 270, 2.9% by weight OH groups, Bayer A G, Lev., Del.), 20.9 g of distilled water, 1.6 g of 10% strength dimethylethanolamine in water and 3.9 g of commercial wetting agents, 3.6 g of titanium dioxide (Tronox® R-FD-I, Kerr McGee Pigments GmbH and Co. K G, Krefeld, Del.), 1.7 g of lamp black (Spezialschwarz 4, Degussa-Hüls, Frankfurt, Del.), 50.6 g of barium sulphate (Blanc fixe Micro, Sachtleben Chemie GmbH, Duisburg, Del.), 5.8 g of talc (Micro Talc IT Extra, Norwegian Talc, Frankfurt, Del.) and 0.9 g of anti-settling agent (Aerosil® R 972, Degussa-Hüls A G, Frankfurt, Del.) is ground to a paste for 30 minutes in a commercial bead mill, with cooling.

This produces paint systems having a binder:resin solids ratio of 10:2:88 parts by weight polyester resin/melamine resin/polyurethane dispersion (see examples) and also a binder-pigment/filler ratio of 1:0.8, which exhibit the following properties:

| Example | Comparative 3 | Example 18 | Example 19 |
|---|---|---|---|
| Solids content (% by weight) | 42.5 | 51.1 | 51.0 |
| pH | 8.3 | 8.3 | 8.3 |
| Efflux time ISO cup 5 mm | 22 s | 21 s | 22 s |
| And after storage at 40° C. for 30 d | 15 s | 20 s | 21 s |

| Example | Comparative 4 | Example 20 |
|---|---|---|
| Solids content (% by weight) | 42.5 | 48.5 |
| pH | 8.3 | 8.3 |
| Efflux time ISO cup 5 mm | 27 s | 28 s |
| And after storage at 40° C. for 30 d | 19 s | 27 s |

These paints are applied to the substrates below in a resulting dry film thickness of from 25 to 35 μm using a gravity-feed cup-type spray gun with a nozzle diameter of 1.5 mm and an atomizer pressure of 5 bar. The wet paint films are flashed off at 23° C. for 5 minutes and then baked in a forced air oven. The substrates are glass plates in the case of the pendulum hardness and gloss tests and are degreased steel panels in the case of adhesion/cross-cut and Erichsen cupping.

The following test results are obtained:

Baking conditions: 10 min at RT and 20 min 165° C.

| Example | Comparative 3 | Example 18 | Example 19 |
|---|---|---|---|
| Pendulum hardness | 115 s | 116 s | 94 s |
| Gloss 20°/60° | 24E/69E | 54E/83E | 55E/84E |
| Gloss 20°/60° after paint storage at 40° C. for 30 d | 21E/66E | 52E/82E | 55E/84E |
| Erichsen cupping | 10 mm | 10 mm | 10 mm |
| Cross-cut (0–5) | 0 | 0 | 0 |

| Example | Comparative 4 | Example 20 |
|---|---|---|
| Pendulum hardness | 52 s | 56 s |
| Gloss 20°/60° | 22E/67E | 49E/78E |
| Gloss 20°/60° after paint storage at 40° C. for 30 d | 19E/59E | 45E/74E |
| Erichsen cupping | 10 mm | 10 mm |
| Cross-cut (0–5) | 0 | 0 |

The performance investigations were conducted in accordance with the following methods:
Pendulum hardness: oscillation test according to König DIN 53 157
Gloss measurement 20°/60°: according to DIN EN ISO 2813
Erichsen cupping: according to DIN EN ISO 1520
Cross-cut: according to DIN EN ISO 2409

In a way which is distinctly perceptible the examples according to the invention display higher solids contents and better total values than the comparative examples.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing self-crosslinking polyurethane polymers comprising:
   i) reacting an isocyanate component (A) having an isocyanate group functionality of 2 or more with (B1) an at least difunctional polyol component of number average molecular weight from 62 to 2500, to give an isocyanato-containing or hydroxyl-containing prepolymer,
   ii) adding one or more hydroxy-functional components (B2) having an OH functionality of 1 or more to said prepolymer, and, if desired, adding an isocyanate component (A'), which may be identical to or different from (A), with the proviso that the product of step ii) is an NCO-functional product,
   iii) partially blocking the resultant NCO-functional product with a blocking agent (D),
   iv) reacting a polyol component (B3) having an OH functionality of 2 or more and a number average molecular weight of from 300 to 5000; and
   v) reacting the product in iv) with an acid-functional compound and an isocyanate component (A"), which may be identical to or different from (A) and (A') to provide polyurethanes containing free hydroxyl groups.

2. The process of claim 1, wherein the product of step i) is an NCO-functional prepolymer.

3. The process of claim 1, wherein isocyanate component (A)/(A') is selected from the group consisting of isophorone diisocyanate, bis(4,4-isocyanatocyclohexylmethane), hexamethylenediisocyanate, and mixtures thereof.

4. The process of claim 1, wherein the polyol component (B1) comprises 2-functional to 6-functional polyol components of molecular weight from 62 to 2500, at least one of these components being an acid-functional compound.

5. The process of claim 1, wherein the acid-functional compound is 3-hydroxy-2,2-dimethylpropanoic acid (hydroxypivalic acid) or dimethylolpropionic acid.

6. The process of claim 1, wherein the hydroxy-functional component (B2) is selected from the group consisting of
   b1) 2-functional to 6-functional alcohols having average molecular weights of from 62 to 300,
   b2) linear difunctional polyols having average molecular weights of from 300 to 4000,
   b3) monofunctional linear polyethers having average molecular weights of from 300 to 3000.

7. The process of claim 1, wherein the polyol components (B3) are polyethers or polyesters having average functionalities of from 2.5 to 4 OH groups per molecule.

8. Self-crosslinking polyurethane polymers produced by the process of claim 1.

9. Aqueous dispersions comprising water and the self-crosslinking polyurethanes produced by the process of claim 1.

10. The process of claim 2, wherein isocyanate component (A)/(A') is selected from the group consisting of isophorone diisocyanate, bls(4,4-isocyanatocyclohexylmethane), hexamethylenediisocyanate, and mixtures thereof.

11. The process of claim 2, wherein the polyol component (6) comprises 2-functional to 6-functional polyol components of molecular weight from 62 to 2500, at least one of these components being an acid-functional compound.

12. The process of claim 2, wherein the acid-functional compound is 3-hydroxy-2,2-dimethylpropanic acid (hydroxypivalic acid) or dimethylolpropionic acid.

13. The process of claim 2, wherein the hydroxy-functional component (B2) is selected from the group consisting of
   b1) 2-functional to 6-functional alcohols having average molecular weights of from 62 to 300,
   b2) linear difunctional polyols having average molecular weights of from 300 to 4000,
   b3) monofuntional linear polyethers having average molecular weights of from 300 to 3000.

14. The process of claim 2, wherein the polyol components (B3) are polyethers or polyesters having average functionalities of from 2.5 to 4 OH groups per molecule.

15. Self-crosslinking polyurethane polymers produced by the process of claim 2.

16. Aqueous dispersions comprising water and the self-crosslinking polyurethanes produced by the process of claim 2.

17. A process for preparing self-crosslinking polyurethane polymers comprising:
   i) reacting an isocyanate component (A) having an isocyanate group functionality of 2 or more with (B1) an at least difunctional polyol component of number average molecular weight from 62 to 2500, to give an isocyanato-containing or hydroxyl-containing prepolymer,
   ii) adding one or more hydroxy-functional components (B2) having an OH functionality of 1 or more to said prepolymer, and, if desired, adding an isocyanate component (A'), which may be identical to or different from (A), with the proviso that the reaction product of step ii) Is an NCO-functional product, iii) partially blocking the resultant NCO-functional product with a blocking agent (D), iv) reacting a polyol component (B3) having an OH functionality of 2 or more and a number average molecular weight of from 300 to 5000; and v) reacting the product in iv) with an acid-functional compound and an isocyanate component (A″), which may be identical to or different from (A) and (A′) to provide polyurethanes containing free hydroxyl groups;

wherein isocyanate component (A)/(A′) is selected from the group consisting of isophorone diisocyanate, bis(4,4-isocyanatocyclohexylmethane) hexamethylenediisocyanate and mixtures thereof;

polyol component (B1) comprises 2-functional to 6-functional polyol components of molecular weight from 62 to 2500, at least one of these components being an acid-functional compound (C) selected from 3-hydroxy-2,2-dimethylpropanoic acid (hydroxypivalic acid) or dimethylolpropionic acid;

hydroxy-functional component (B2) is selected from the group consisting of b1) 2-functional to 6-functional alcohols having average molecular weights of from 62 to 300, b2) linear difunctional polyols having average molecular weights of from 300 to 4000, b3) monofunctional linear polyethers having average molecular weights of from 300 to 3000; and polyol components (B3) are polyethers or polyesters having average functionalities of from 2.5 to 4 OH groups per molecule.

18. Self-crosslinking polyurethane polymers produced by the process of claim 18.

19. Aqueous dispersions comprising water and the self-crosslinking polyurethanes produced by the process of claim 17.

* * * * *